United States Patent [19]

Lopez

[11] 4,320,222

[45] Mar. 16, 1982

[54] STORAGE-STABLE PRECATALYZED POLYEPOXIDE COMPOSITIONS

[75] Inventor: John A. Lopez, Houston, Tex.

[73] Assignee: Shell Oil Company, Houston, Tex.

[21] Appl. No.: 139,055

[22] Filed: Apr. 10, 1980

[51] Int. Cl.³ .................... C08G 59/62; C08G 59/68
[52] U.S. Cl. .................................... 528/89; 528/104; 528/409; 525/524
[58] Field of Search ................... 528/89, 104, 409

[56] References Cited

U.S. PATENT DOCUMENTS

| | | | |
|---|---|---|---|
| 3,477,990 | 11/1969 | Dante et al. | 528/89 |
| 3,948,855 | 4/1976 | Perry | 528/89 |
| 3,978,027 | 8/1976 | Marshall | 528/104 X |
| 4,026,862 | 5/1977 | Smith et al. | 528/89 X |
| 4,105,634 | 8/1978 | Hanson et al. | 526/65 |

Primary Examiner—Earl A. Nielsen
Attorney, Agent, or Firm—Norris E. Faringer

[57] ABSTRACT

A precatalyzed, elevated temperature storage-stable epoxy composition is described wherein the catalyst composition is a mixture of a phosphonium halide and an alkali metal salt of a hydroxide or halide. The preparation of higher molecular weight fusion products wherein the precatalyzed epoxy composition is reacted with a polyhydric phenol is also described.

10 Claims, No Drawings

STORAGE-STABLE PRECATALYZED POLYEPOXIDE COMPOSITIONS

BACKGROUND OF THE INVENTION

This invention relates to a storage-stable at elevated temperatures, precatalyzed polyepoxide composition which is especially suitable for subsequent reaction with a phenol to produce higher molecular weight fusion products.

The use of precatalyzed polyepoxide compositions and their subsequent reaction with phenols is well-known. See, for example, U.S. Pat. No. 3,477,990, which is directed to precatalyzed polyepoxides containing phosphonium halides as well as their reaction with phenols.

It is also known that the polyepoxide/phenolic reaction can be catalyzed by phosphines as disclosed in U.S. Pat. No. 3,547,881 and by potassium iodide as disclosed in U.S. Pat. No. 3,978,027.

While these known catalysts are quite acceptable as catalysts for the epoxy-phenoxy reaction, when these catalysts are admixed with the epoxy resins to produce a "pre-catalyzed" epoxy composition, the storage stability at elevated temperatures is not acceptable for many applications because of the reduced activity. It has now been found that the elevated temperature storage stability of the precatalyzed epoxy compositions of U.S. Pat. No. 3,477,990 can be significantly improved by the addition of a small amount of a halide or hydroxide of an alkali metal, e.g., potassium iodide or potassium hydroxide.

SUMMARY OF THE INVENTION

The present invention is directed to an improved elevated temperature storage stable precatalyzed polyepoxide containing a synergistic catalyst combination comprising a phosphonium halide and an alkali metal halide or hydroxide. The present invention is further directed to a process for reacting these pre-catalyzed epoxy compositions with phenols and to the resulting fusion products.

DETAILED DESCRIPTION OF THE INVENTION

The instant compositions comprise a polyepoxide and a catalytic amount of a synergistic combination comprising a phosphonium halide and an alkali metal halide or hydroxide.

THE POLYEPOXIDES

Although normally liquid epoxies are suitable in the present compositions, semi-solid epoxy resins as well as mixtures of solid and liquid resins are useful.

The liquid polyepoxides employed in the present invention include those compounds possessing more than one vic-epoxy group per molecule, i.e., more than one

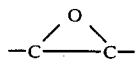

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. More preferred are the glycidyl polyethers of 2,2-bis(4-hydroxyphenyl)propane having an average molecular weight between about 300 and about 900 and a epoxide equivalent weight of between about 140 and about 500. Especially preferred are the glycidyl polyethers of 2,2-bis(4-hydroxyphenyl)propane having an average molecular weight of between about 300 and about 900, an epoxide equivalent weight of between about 140 and about 500, and containing from about 0.1% to about 1.0% weight or higher saponifiable chlorine. As used herein the terms "epoxide equivalent weight" and "weight per epoxide" refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

PHOSPHONIUM HALIDES

The catalyst used for the process of the invention is a phosphonium halide. Preferred phosphonium halides are those conforming to the formula

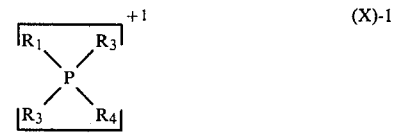

wherein X is a halogen atom, and $R_1$, $R_2$, $R_3$ and $R_4$ are the same or different and represent hydrocarbon residues which may or may not be substituted by one or more functional groups, such as halogen atoms. These phonphonium halides may generally be prepared by mixing in approximately equimolar proportions a phosphine with a halide. The mixing may be carried out with or without the application of heat, alone or in the presence of an inert solvent such as, for example, diethylether, benzene, chloroform or carbon tetrachloride.

Preferred phosphines are the organic phosphines, i.e., compounds of the formula $$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, triauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

Compounds to be mixed with the phosphine in the preparation of the phosphonium halide catalyst include organic halides.

Preferred organic halides are those wherein the organic radical is a hydrocarbon radical, preferably having from 1 to 10 carbon atoms. Examples of preferred organic halides include methylchloride, ethyl chloride, methyl bromide, ethyl bromide, methyl iodide, ethyl iodide, propyl iodide, n-butyl iodide, sec-butyl iodide and n-decyl iodide.

Examples of suitable phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium iodide, ethyltributyl phosphonium iodide, propyl tributyl phosphonium iodide, methyl triphenyl phosphonium chloride, ethyl triphenyl phosphonium chloride, propyl tributyl phosphonium iodide, n-butyl triphenyl phosphonium chloride and ethyl triphenyl phosphonium bromide.

To illustrate the way in which these phosphonium catalysts are prepared, an example is given for the preparation of ethyl triphenyl phosphonium iodide. 52 gr. of triphenyl phosphine was dissolved in 100 ml. benzene and 32 gr. of ethyl iodide was added slowly. The mixture was refluxed for 4 hours and then the white precipitates was filtered off and dried. 63 gr. of ethyl triphenyl phosphonium iodide was obtained having a melting point of 161°-162° C.

ALKALI METAL HALIDES AND HYDROXIDES

The alkali metal halides and hydroxides useful in the present compositions include sodium chloride, sodium iodide, sodium bromide, potassium chloride, potassium iodide, potassium bromide, sodium hydroxide, potassium hydroxide, and the like.

Preferred are potassium iodide and potassium hydroxide.

The amount of phosphonium halide catalyst will vary over a wide range. In general, the amount of phosphonium halide will vary from about 0.001% to about 10% by weight of the polyepoxide, and preferably from about 0.05% to about 5% by weight.

The amount of alkali metal halide or hydroxide will vary widely also. Generally, the amount will vary within the same range as the phosphonium halide component.

Excellent storage stability at elevated temperatures is obtained when the catalyst combination comprises from about 0.05% to 5.0% of ethyl triphenyl phosphonium iodide and from about 0.01% to 1.0% of potassium iodide or potassium hydroxide based on the weight of epoxy resin. Such catalyst combinations extends the useful life more than 30 days at temperatures at or about 200° F. (93° C.) than the phosphonium halide alone, or the metal hydroxide or halide alone.

As noted hereinbefore, these storage stable, catalyzed polyepoxide compositions may be reacted with phenols to produce higher molecular weight fusion resins which can be subsequently cured with conventional epoxy curing agents to produce surface coatings, adhesives, laminates, etc.

PHENOLS

Suitable phenols include those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)-pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

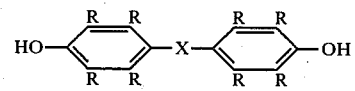

wherein X is a polyvalent element or radical and R independently is a member of the group consisting of hydrogen, halogen and hydrocarbon radicals. The preferred elements or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals, such as

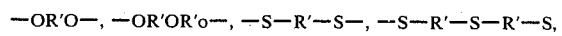

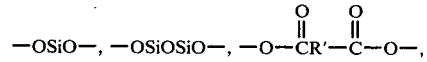

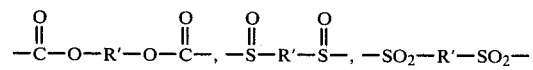

radicals wherein R' is a divalent hydrocarbon radical.

Various examples of phenols that may be used in this invention are also given in U.S. Pat. No. 3,477,990 (e.g., column 5, line 1 to column 6, line 10) and it is to be understood that so much of the disclosure of that patent relative to examples of phenols is incorporated by reference into this specification.

The amount of the pre-catalyzed epoxide and the phenol to be employed in the process varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results are obtained when the higher molecular weight resins are produced and in this case the ratios of reactants are varied depending upon the molecular weight desired and upon the type of end groups, i.e., whether the product is to be terminated with an epoxide or with a phenol.

An especially preferred phenolic hydroxy ether resin having an epoxide equivalent weight of between about 2000 and about 4000 obtained by reacting 2,2-bis(4-hydroxyphenyl)propane with the diglycidyl ether of 2,2-bis(4-hydroxyphenyl)propane having an epoxide equivalent weight between about 140 and about 500 containing a catalyst combination comprising from about 0.05% to 0.5% by weight of ethyl triphenyl phosphonium iodide and from about 0.01% to 0.1% of potassium iodide or potassium hydroxide.

The reaction is conducted in the presence or absence of solvents or diluents. In most cases, the reactants are liquid and the reaction is easily effected without the addition of solvents or diluents. However, in some cases, where either or both reactants are solids or viscous liquids it is desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

When it is desired to produce phenolic hydroxy ethers of higher viscosities but not higher epoxide equivalent weights, the polyepoxide and phenol are subjected to thermal bodying prior to the addition of the catalyst. "Thermal bodying" refers to heating the polyepoxidephenol mixture at specified temperatures and times prior to adding the catalyst. A preferred thermal bodying treatment comprises heating the polyepoxide mixture to a temperature of between about 120° C. and 200° C., preferably between about 145° C. and about 165° C., for between about 15 minutes and 60 minutes.

The products obtained by the above process are the desired phenolic hydroxy ether compounds. Their physical characteristics depend upon the desired reactants and proportions. In general, the products vary from liquids to solids, and in the case of the high molecular weight resins vary from viscous liquids to hard solids. The products possess at least one alcoholic hydroxyl group formed by each reaction of the epoxide and phenolic hydroxyl group, and can be further reacted through this group or groups. The polyfunctional reactants also give products terminated in phenolic hydroxyl groups and/or epoxy groups, and these are available for further reaction.

A group of products which are particularly outstanding are those resins and polymers obtained by the reaction of the precatalyzed polyepoxides and polyhydric phenols in controlled proportions. Those which use an excess of the polyepoxide are terminated in epoxy groups and can be used as polyepoxides in known reactions of polyepoxides and curing agents and the like. These high molecular weight polyepoxides are particularly useful in preparing surface coatings, adhesive, laminates, filament windings, coatings for highways and airfields, structural applications, formation of foams and the like. Those prepared from the halogenated polyhydric phenols are particularly useful as flame proofing resins for forming laminates, coatings and the like. As stated earlier, the present invention is particularly useful for preparing epoxy resins to be used as coatings for the packaging and storing of foodstuffs.

CURING OF THE EPOXY CONTAINING, PHENOLIC HYDROXY ETHER COMPOUNDS

The epoxy-containing, phenolic hydroxy ether compounds obtained by use of the present invention are reacted with various conventional curing agents to form hard insoluble, infusible products. Examples of suitable curing agents include, among others, the polybasic acids and their anhydrides such as the di, tri- and higher carboxylic acids; those acids containing sulfur, nitrogen, phosphorus or halogens; amino-containing compounds such as, for example, diethylene triamine and pyridine; polyamides containing active amino and/or carboxyl groups; and others.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15 % by weight. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active hydride (or anhydride group) per epoxy group.

Solvents or diluents are sometimes added to make the composition more fluid or sprayable. Preferred solvents or diluents include those which are volatile and escape from the polyepoxide composition before or during cure such as esters, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amino-containing curing agents generally cure at or near ambient temperature and no heat be applied. The acids, anhydrides, and melamine derivatives, on the other hand, generally require heat, such as temperatures ranging from about 65° C. to about 210° C. Preferred temperatures range from about 90° C. to about 210° C. and more preferably from about 120° C. to 195° C.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

EXAMPLE I

This example illustrates the effectiveness of the instant, novel catalyst combination.

To ten grams of a liquid epoxy resin [diglycidyl polyether of 2,2-bis(4-hydroxyphenyl)propane having an average molecular weight of about 380 and a weight per epoxy (WPE) of about 190] were added 0.1% based on the epoxy resin of ethyl triphenyl phosphonium iodide (TPPEI). Then three grams of 2,2-bis(4-hydroxyphenyl)propane were added and the mixture held at 160° C. for 45 minutes and the WPE determined. A WPE of about 540–570 indicates that the catalyzed epoxy resin composition has 100% reactivity, and a WPE of 260–270 indicates that the catalyzed epoxy resin has essentially no reactivity. The precatalyzed epoxy resin was also stored at various temperatures and after certain time intervals, the mixture was reacted with BPA and the WPE of the reaction product determined. A reduction in WPE thus indicates that the catalyzed resin is not stable at the storage temperature. This procedure was essentially repeated wherein 0.01 and 0.03% by weight of potassium hydroxide and potassium iodide were employed, each alone and in combination with TPPEI. The results are tabulated in Table I.

that epoxy resins that contain either KOH and KI are relatively unstable upon storage even at moderate temperatures. The data further illustrates that the TPPEI/KOH and TPPEI/KI catalyst combinations produce storage-stable pre-catalyzed epoxy resin compositions. It will be appreciated that precatalyzed epoxy resin compositions which are storage stable over a long period of time at higher than ambient or normal storage conditions is a most commercially attractive composition.

What is claimed is:

1. A pre-catalyzed epoxy resin composition comprising (A) a polyepoxide and (B) a catalyst combination comprising (1) from about 0.05% to about 5.0% by weight of a phosphonium halide and (2) from about 0.01% to about 1.0% by weight of an alkali metal hydroxide or halide, based on the polyepoxide.

2. The composition of claim 1 wherein the polyepoxide is a diglycidyl ether of 2,2-bis(4-hydroxyphenyl)propane.

3. The composition of claim 2 wherein the diglycidyl ether of 2,2-bis(4-hydroxyphenyl)propane has an epoxide equivalent weight between about 140 and about 500.

4. The composition of claim 1 wherein the phosphonium halide is ethyl triphenyl phosphonium iodide.

5. The composition of claim 1 wherein the alkali metal hydroxide is potassium hydroxide.

6. The composition of claim 1 wherein the alkali metal halide is potassium iodide.

7. A higher molecular fusion composition prepared by reacting the composition of claim 1 with a phenol.

8. The composition of claim 7 wherein the phenol is a polyhydric phenol.

9. The composition of claim 8 wherein the polyhydric phenol is 2,2-bis(4-hydroxyphenyl)propane.

10. A curable composition comprising the composition of claim 7 and an epoxy curing agent.

TABLE I

| | | STORAGE STABILITY OF PRE-CATALYZED EPOXY RESIN COMPOSITION REACTIVITY, WPE | | | | | | |
|---|---|---|---|---|---|---|---|---|
| Temp. °C. | Storage Days | 0.1 TPPEI | 0.03 KOH | 0.06 KOH | 0.03 KI | 0.06 KI | 0.1 TPPEI + 0.03 KOH | 0.1 TPPEI + 0.06 KI |
| 50° | 0 | 545 | 497 | 508 | 473 | 492 | 563 | 550 |
| (120–125° F.) | 30 | 546 | — | — | — | — | 590 | 564 |
| | 35 | — | 349 | 334 | 352 | 350 | — | — |
| | 60 | 547 | — | — | — | — | 538 | 557 |
| | 120 | 591 | — | — | — | — | 560 | 576 |
| | 180 | 522 | — | — | — | — | 562 | — |
| 71° | 0 | 545 | 497 | 508 | 473 | 492 | 563 | 550 |
| (160° F.) | 17 | — | — | — | — | — | — | 540 |
| | 30 | 584 | — | — | — | — | 585 | — |
| | 35 | — | 340 | 332 | 338 | 351 | 586 | — |
| | 60 | 527 | — | — | — | — | — | — |
| | 90 | 500 | — | — | — | — | 590 | — |
| | 152 | — | — | — | — | — | 553 | — |
| 93° | 0 | 545 | — | — | — | — | 563 | 550 |
| (200° F.) | 17 | 272 | — | — | — | — | — | — |
| | 21 | — | — | — | — | — | 480 | 542 |
| | 30 | — | — | — | — | — | 13 | 435 |

The data in Table I clearly shows that while the ethyl triphenyl phosphonium halide is an effective storage-stable catalyst in epoxy resins at temperatures up to about 71° C., such halide is not storage-stable at higher temperatures, e.g., 93° C. The data also clearly shows